March 5, 1946.    W. G. BALDENHOFER    2,396,147
COOLING SYSTEM FOR HYDRAULICALLY-OPERATED MACHINE TOOLS
Filed Feb. 18, 1942    2 Sheets-Sheet 1

INVENTOR
WILLIAM G. BALDENHOFER
BY Toulmin & Toulmin
ATTORNEYS

March 5, 1946. W. G. BALDENHOFER 2,396,147
COOLING SYSTEM FOR HYDRAULICALLY-OPERATED MACHINE TOOLS
Filed Feb. 18, 1942 2 Sheets-Sheet 2
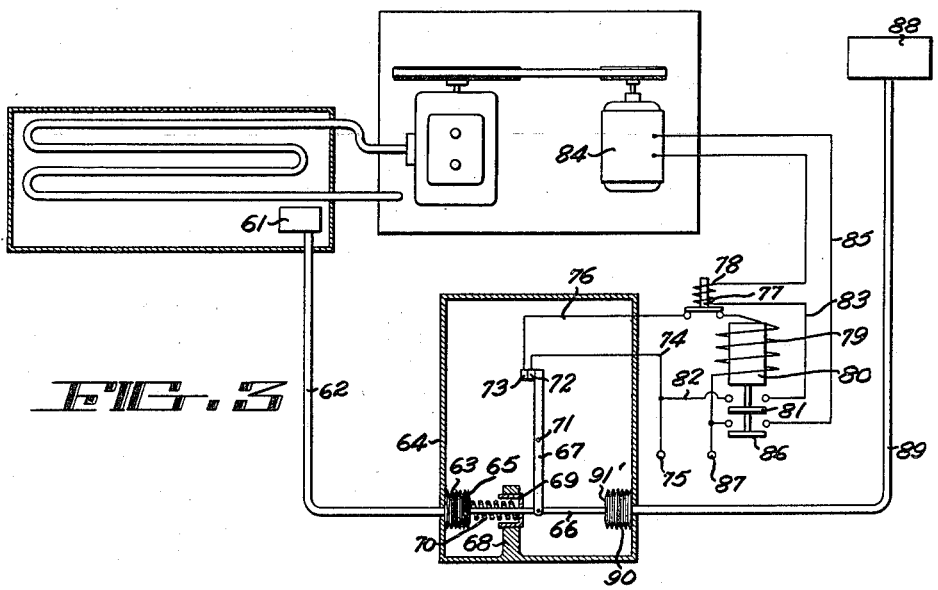
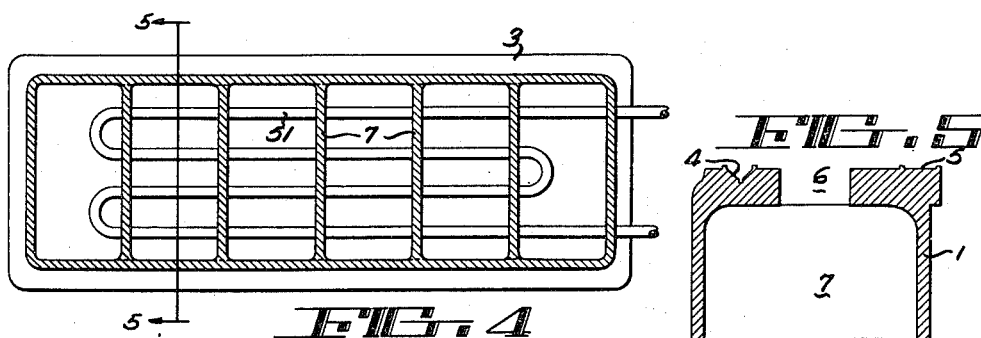
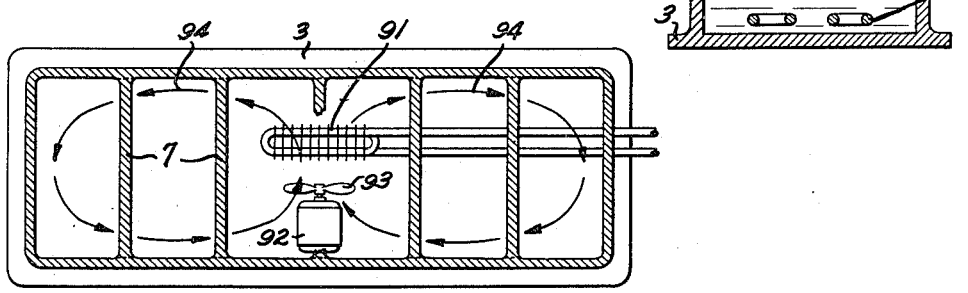
INVENTOR
WILLIAM G. BALDENHOFER
BY Toulmin & Toulmin
ATTORNEYS Patented Mar. 5, 1946

2,396,147

UNITED STATES PATENT OFFICE 2,396,147

COOLING SYSTEM FOR HYDRAULICALLY OPERATED MACHINE TOOLS

William G. Baldenhofer, Springfield, Ohio, assignor to The Thompson Grinder Company, Springfield, Ohio, a corporation of Ohio Application February 18, 1942, Serial No. 431,454

5 Claims. (Cl. 51—233)

The present invention relates to metal-working machines, particularly those of a heavy type and employing reciprocatory carriages or other heavy moving parts. The invention is concerned more especially with those machines which employ forced lubrication and which are designed for precision work.

In certain types of machines, such as grinders which utilize a heavy reciprocable table, the problem of lubrication is an important item. Oil under pressure is usually employed for this purpose, the flow of the oil being controlled by shut-off and throttle valves. It has been found that in valves of this character, particularly when they are in an almost completely closed condition, appreciable quantities of heat may be developed, and this heat is transferred to the bearing surfaces either by conduction or radiation. It therefore becomes necessary to cool the oil in order to maintain the bearing surfaces at a relatively constant temperature, and in accordance with the present invention a refrigerant is employed for this purpose.

The refrigerated oil, in contacting the bearing surfaces, cools only restricted portions of the machine, more particularly the bed and ways in the case of a grinder, but leaves the remainder of the machine, such as the vertical column, crossfeed mechanism, etc. at a temperature not greatly in excess of room temperature. Thus the difference between the temperature of the bed and its ways, which is controlled by the temperature of the refrigerated oil, and the temperature of the remainder of the machine which is controlled to a great extent by the room temperature, remains substantially constant in case the room temperature does not appreciably vary. However, when the room temperature increases, for example during an excessively hot day, the temperature of a large portion of the machine increases in substantially the same amount, but the temperature of the cooled surfaces may remain at a constant value, depending on the efficacy of the refrigerating system. It is apparent that under these circumstances there may exist a wide and variable differential between the temperature of the cooled portions of the machine and the remaining portions thereof.

In the case of heavy-duty but high precision grinders, in which the bed and its ways are of considerable length, it is essential that the temperatures of any of the contacting surfaces shall have the same differential with respect to the room temperatures in order to prevent the introduction of warping and strains within the machine which tend to reduce the precision effects. Another reason for maintaining a constant differential between the temperature of the ways and room temperature is that in the case of high precision metal-working machines the temperature of the work obviously conforms to the temperature of the room, and since the work is laid on the bed of the machine it is important that the temperature of the work and the temperature of the bed will not appreciably change as a differential notwithstanding abrupt and marked changes in the room temperature.

The primary object of the invention is to provide an improved oil-lubricating system which is especially adapted to machines having a reciprocable work table and in which it becomes necessary, from the standpoint of precision work, to make a substantially constant temperature differential between the parts which reciprocate with respect to one another and the remaining parts of the machine.

Another object of the invention is to provide an improved lubricating system for machines engaged in precision work, and in which the lubricant and the parts immediately affected thereby are maintained at a relatively constant temperature or at least are maintained at a temperature showing a constant differential with respect to the temperature of the room.

A more general object is to provide an improved lubricating system which is adapted to any type of high precision metal-working or metal-treating machine, the temperature of the oil in the system being so controlled that predetermined temperatures are maintained at the surfaces between stationary and moving parts, in order to prevent warping or strain which might otherwise deleteriously affect the precision of working or treatment provided by the machine.

These and other advantages will be apparent after reading the following specification in connection with the drawings.

In the drawings:

Figure 3 is a schematic plan view of the oil-cooling system, including a temperature-determining electrical switch which responds to a temperature differential.

Figure 4 is an enlarged sectional view taken along the line 4—4 in Figure 1.

Figure 5 shows a cross section taken along the line 5—5 in Figure 4, looking in the direction of the arrows, while Figure 6 represents a modified structure by which the oil is cooled.

Figure 1:
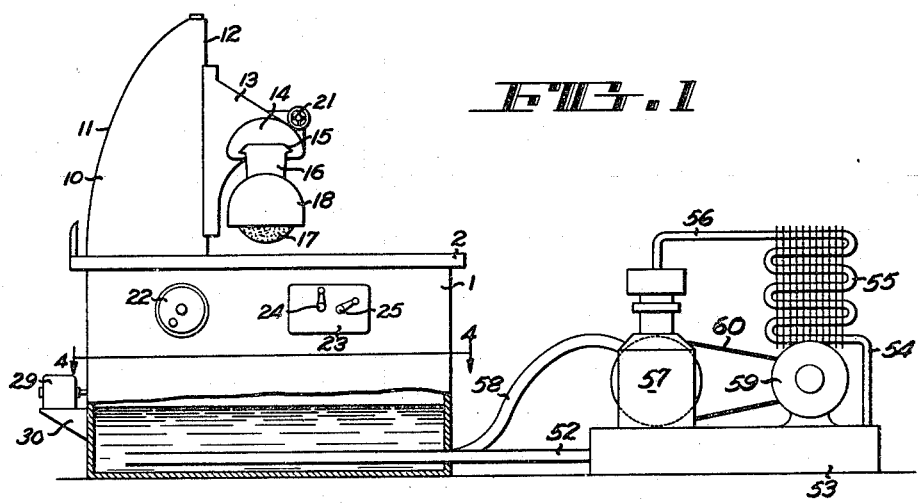
Figure 1 shows in diagram a typical machine to which the invention may be applied, specifically a grinder, operating in connection with a typical lubricant-cooling apparatus illustrated as a compressor, condenser and expansion coil unit.

Referring more particularly to Figure 1, the numeral 1 designates the bed of a grinder, the table of which is indicated at 2. This bed takes the form of a heavy elongated casting of hollow rectangular shape and having a flanged bottom indicated at 3 (Figure 5); and terminating at the top in a V-shaped way 4 and a rectangular way or guide 5. The top portion of the bed is preferably provided with a longitudinally extending slot 6, and the sides of the bed are reenforced by a plurality of equi-distantly spaced webs 7 which extend downwardly from the under side of the top or table portion to a distance approximately half the depth of the bed. The latter therefore comprises a heavy box-like structure completely closed on all sides except for the opening 6, and having the webs 7 extending across to the opposite sides of the box throughout substantially its entire length.

Figure 2:
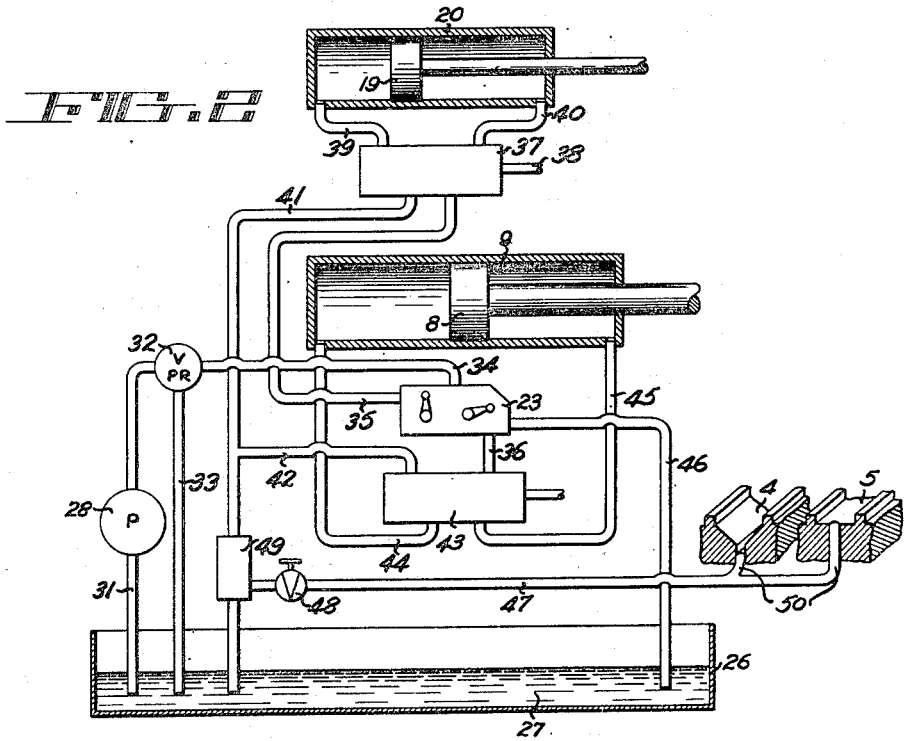
Figure 2 shows a hydraulic circuit, including control valves and employed for actuating the mechanism of an exemplary machine.

On top of the table 2 there is mounted, in any suitable and well known manner, a carriage (not shown) which is adapted to be moved lengthwise of the table when actuated in any suitable manner, for example, a piston 8 contained in a cylinder 9 and actuated by fluid pressure, as will be explained in connection with Figure 2. Rising upwardly from the table 2 and to one side thereof so as to clear the moving carriage, there is a vertical column 10 which has an arcuate configuration at the rear, as indicated at 11, and is provided at the front edge with a dovetail slide indicated at 12, which is adapted to receive a saddle 13. The latter is provided with a dovetail groove which fits over the slide 12 and to which it is suitably gibbed, as is well known in the art. The saddle 13 extends downwardly and outwardly from its dovetail groove and is provided at its outer end with a pair of oppositely directed heavy flange portions 14, of circular configuration and having a depth sufficient to receive a dovetail groove 15 which extends transversely of the machine. This groove is adapted to receive a carrier 16 provided with a suitable dovetail slide. This carrier provides the support for a grinding or other type of abrasive wheel 17, suitably journalled in the carrier and having a guard element 18 on both sides thereof. The carrier 16 is adapted to move transversely of the table 2, and in the typical machine illustrated is actuated by a crossfeed piston 19 contained in a cylinder 20 (Figure 2). If desired the carrier may be manually moved transversely of the machine by means of a hand wheel 21.

The front of the bed 1 is provided with a wheel 22, which may be used to elevate the saddle 13 with respect to the column 11, thus to control the height of the wheel 17 with respect to the table 2. The bed may also be provided with a lever plate 23 having a lever 24 which controls the speed of the crossfeed piston 19. A lever 25 may also be positioned on the plate 23 to control the speed of the carriage-operating mechanism, as will be explained more fully in connection with Figure 2. It has been explained that the carrier 16 and the carriage (not shown) are preferably actuated hydraulically by means of the pistons 19 and 8, respectively. A typical hydraulic circuit for supplying pressure fluid to the cylinders 20, 9 is illustrated in Figure 2. The entire lower portion of the bed 1 may be employed as a reservoir for a combined pressure-operating fluid and lubricant. This reservoir is indicated in Figure 2 by the numeral 26, and the fluid is designated 27.

In order to provide pressure to the actuating fluid a pump 28 is employed, the pump being driven preferably by an electric motor indicated at 29 in Figure 1. The motor may be supported on a triangularly shaped member 30 extending to the rear of the bed. A conduit 31 is taken from the reservoir 26 to the pump 28, then extending from the pressure side of the pump through a throttling control valve 32 provided with an exhaust connection, indicated at 33. From the valve 32 a conduit 34 is taken to a suitable valve (not shown) positioned at the rear of the plate 23 and through which pressure fluid may be carried to conduits 35 and 36 when the levers 24 and 25 are operated. The latter may be of the throttling type so as to admit full passage to the pressure fluid passing between the conduits 34 and 35 or between the conduits 34 and 36, and in addition the levers may serve to control the rate of fluid flow into the conduits 35, 36. The conduit 35 passes into a reversing valve 37 which may be automatically or hand-operated through a rod 38. There is a pair of conduits 39, 40 extending from opposite ends of the cylinder 20 to the reversing valve 37. The reversing valve 37 is connected through a conduit 41 to the reservoir 26. The reversing valve 37 may be of any suitable and well known type, by which, when the rod 38 is operated in the proper direction, pressure fluid in the pipe 35 may be supplied, for example, to the conduit 40, leaving the other conduit 39 to form an exhaust through the conduit 41 to the reservoir.

From the conduit 41 there is taken a pipe 42 which passes into a reversing valve 43 of a type similar to the reversing valve 37. A conduit 44 is connected from the other side of the reversing valve 43 to one end of the cylinder 9. A pipe 45 is taken from the opposite end of the cylinder 9 to the reversing valve 43, this pipe being adapted to connect with the conduit 36 when the reversing valve 43 has been operated in the proper direction. A pipe 46 is taken from the reservoir 26 to the multi-control valve member at the rear of the plate 23. A pipe 47 is connected at one end through a throttle valve 48 to a coupling 49 in the conduit 41, and at its opposite end the pipe 47 is provided with a plurality of branches 50 which open into the bottom of the V-shaped and rectangularly shaped ways, 4, 5.

Assume that the pump 28 is being actuated by the motor 29 and that the valve 32 is turned to such a position that pressure fluid is passed into the conduit 34 but is prevented from reaching the exhaust conduit 33. Now assume that the lever 25 has been moved into such a position that the pressure fluid in the pipe 34 passes through the immediately associated valve and is received by the pipe 36, and after passing through the reversing valve 43 flows through the pipe 45 into the right-hand end of the cylinder 9. The piston 8 will be caused to move to the left and thus to operate the carriage in the desired work-engaging direction. The exhaust from the cylinder 9 is passed through the pipe 44, through the reversing valve 43, the pipe 42 and through the lower end of the pipe 41 to the reservoir. Thus no back pressure would be developed behind the piston 8. A portion of the fluid which passes through the lower end of the conduit 41 would flow through the valve 48, into the pipe 47 and thence to the branches 50 to lubricate the ways 4, 5.

When it is desired to operate the cross-feed piston 19 for moving the grinding wheel 17 in the transverse direction with respect to the table 2, the lever 24 is operated (with or without moving the lever 25, depending on the type of cut desired) so that pressure fluid is passed through the conduit 34 into the conduit 35, through the reversing valve 37 and the conduit 40 to the right-hand end of the crossfeed cylinder 20. The exhaust from this cylinder is taken through the pipe 39, the reversing valve 37, the pipe 41, through the coupling 49 into the reservoir, and a portion of this exhaust fluid is carried through the pipe 47 to the ways 4, 5. Thus the carrier 16 is caused automatically to move through a predetermined distance crosswise of the work to position the grinding wheel 17 for its next longitudinal cut.

In order to reverse the carriage the levers 24 and 25, also the reversing valve 43 are so operated that pressure fluid is passed from the conduit 34 to the conduit 36, thence to the pipe 44 to the left-hand end of the carriage-operating cylinder 9. The exhaust from the cylinder in this case takes place from the pipe 45, through the reversing valve 43, into the pipe 36 and thence through the pipe 46 to the reservoir. The return movement of the crossfeed piston 19 is effected from the conduit 34, through the valve at the rear of the plate 23, thence through the conduit 35, through the reversing valve 37 to the conduit 39 at the left-hand end of the crossfeed cylinder. The exhaust from this cylinder passes from the pipe 40, through the valve 37 and the conduit 41 to the reservoir, a portion of this pressure passing through the valve 48, the pipe 47 to the ways 4, 5. It will be noted that all of the fluid pressure, regardless of the direction in which the pistons 9 and 19 are being actuated, passes through the valve 32. In case it is desired to cut off the pressure fluid from the high pressure line 34, the valve 32 would be operated, which would not only serve to close the pipe 34 but would also by-pass the full output of the pump into the conduit 33 to the reservoir.

It is apparent that when the valve 32 has been operated to a throttling position, considerable heat is developed at this point, and this heat is communicated to the passing fluid. Other sources of heat can be found at the reversing valves 37, 43, also at the control valve which is secured to the plate 23 and at the valve 48. This heat is in addition to the heat which may be generated at the pistons 9 and 19, and the net result of these throttling and work-producing effects is that the temperature of the passing fluid may be considerably elevated. In case the pressure fluid is constituted of oil which additionally serves as a lubricant at the ways 4, 5, the heat may thin the oil and otherwise deleteriously affect its actuating properties at the cylinders 9 and 20 and perhaps its lubricating properties at the ways 4, 5.

In accordance with one of the features of my invention, there is provided an improved method and apparatus for maintaining the temperature of the oil substantially constant, regardless of the heating effects introduced at the various working parts, including those of the valves throughout the system. As shown in Figures 3, 4 and 5, a serpentine pipe 51 is provided within the bed 1, at the bottom thereof, this pipe being adapted to receive brine or any other suitable form of refrigerant such as the so-called "Freon." One end of the pipe 51 is connected through a conduit 52 to a reservoir 53 (Figure 1) containing the surplus of the refrigerant. A conduit 54 is taken through a condensing coil 55, of any suitable and well known type, this coil being connected through a conduit 56 to one side of a compressor 57. The other side of the compressor is connected through a pipe 58 to the other end of the pipe 51 opposite the end to which the pipe 52 is connected. A prime mover, preferably an electric motor 59, may be employed to operate the compressor through a suitable drive 60. The compressor and motor may, if desired, be supported on the casing which forms the reservoir 53. The general arrangement is such that the refrigerant which has become warm by contact with the heated oil passes through the pipe 58, into the compressor 57 and out through the pipe 56 to the condenser coil 55, thence through the pipe 54, into the reservoir 53 and finally through the pipe 52 to complete the circuit through the serpentine conduit 51.

In case it is desired to maintain a relatively constant temperature of the oil in the reservoir 26, a thermostat 61 may be placed within the bed 1 so as to respond to the temperature of the oil, this thermostat being preferably of the pneumatic type although, if desired, a mechanical or electrical form of thermostat may be employed. A fine conduit 62 is connected between the thermostat 61 and a bellows 63 (Figure 3). One end of the bellows is fixed by being secured to a rectangular casing 64, and the free end of the bellows, indicated at 65, is secured to a rod 66 carried at the end of the pivoted lever 67. This rod is supported on an upright 68 which is secured to the casing 64. The upright is provided with an opening which snugly receives an open-ended cap member 69, and a compression spring 70 is positioned between the end 65 of the bellows and the bottom portion of the cap. Thus the spring 70 tends to maintain the bellows in its compressed condition. The lever 67 is pivoted at 71, and at its upper end is provided with a contact 72. The latter is adapted to engage a fixed contact 73. The contact 72 is connected through a conductor 74 to one side of the electric mains 75. The fixed contact 73 is connected by a conductor 76 to the armature 77 of an overload release 78, the circuit being completed through a coil 79 which surrounds the core 80 of a pull-up switch. The latter is provided with a double armature, the upper element 81 of which serves to connect a conductor 82 to the conductor 74, and through a conductor 83 to the coil of the switch 78, thence through the electric motor 84 to the conductor 85 and the lower armature element 86 to the other side of the electric mains 87.

Assuming that the temperature of the oil has increased, the bellows 63 will have been caused to expand to the right so as to rotate the lever 67 counterclockwise about its pivot and to close the contacts 72, 73. This closure of the contacts completes a circuit from the electric main terminal 75, through conductor 74, conductor 76, through the armature 77 of the overload release switch, then through the coil 79 back to the other side 87 of the electric mains. The coil 79, being energized, will pull up its armature 80 to complete a circuit from the terminal 75, through conductor 82, armature 81, conductor 83, through the overload release switch 78 to the motor 84, through conductor 85 and armature 86 to the terminal 87. Thus the motor 84 will become energized to operate the compressor 57. The actuation of the motor will rotate the compressor and the oil exposed to the refrigerating pipe 51 will become cooled, as is well known in the art. When the temperature of the oil has been reduced to the predetermined value the bellows 63 will be permitted to collapse, due to the urge of the spring 70, causing the lever 67 to rotate clockwise and to open the motor circuit at the contacts 72, 73. Consequently, the temperature of the oil is maintained substantially constant by means of the cooling effects exercised by the refrigerant flowing through the expansion coil 51.

While the system described immediately above operates satisfactorily in case the room temperature does not vary considerably, it has been found that when there are variations of this temperature the temperature of the oil, and the parts cooled thereby, remains substantially due to the action of the refrigerant, but the temperature of the parts of the machine not cooled by the refrigerant will change in accordance with the change in room temperature. In the case of high precision metal-working machines, such as grinders, which must grind in some cases to a tolerance of fractions of a thousandth of an inch, it is necessary that the temperature of the cooled parts shall not vary from the room temperature by more than a predetermined and constant amount. In other words, the temperature differential must remain substantially the same notwithstanding abrupt and considerable changes in room temperature. If the temperature differential exceeds the predetermined value not only are deleterious strains set up in the machine as a whole, but slight warping or dislocation in the positions of the various parts may be encountered, thereby introducing inaccuracies in the quality of the work. This is particularly true in the case of a grinder of long length, in which the carriage moves over extensive ways and must do so with an exact alignment throughout its entire length of travel.

In accordance with another feature of my invention, there is provided a structure by which the pressure differential between the temperatures of the room and the cooled parts is maintained substantially constant. Referring more particularly to Figure 3, a second thermostat 88, preferably of a pneumatic type, is provided, this thermostat being located in the room at any position such as not to be affected by the temperature of the oil or other pressure fluid. A conduit 89 is taken from the thermostat 88 to a bellows 90, one side of which is fixed to the side of the casing 64 opposite the bellows 63. The free end 91' of the bellows is connected through the rod 66 to the same end of the lever 67 as the free end 65 of the bellows 63. Assume that the room temperature has increased so that the thermostat 88 has caused the bellows 90 to expand toward the left. This operation will cause the rod 66 to tend to move to the left and thus to open the motor circuit at the contacts 72, 73. Consequently the rod 66, in moving to the left, exerts a pressure on the free end 65 of the bellows 63 and makes it that much harder for the bellows 63 to move the rod 66 to the right to close the contacts 72, 73. The net result of the differential movement of the bellows 90 and 63 is that the contacts 72, 73 will not be closed throughout as long a period as when the contacts were subjected solely to the action of the bellows 63. In other words, the period of time over which the compressor 57 is operated is reduced in accordance with the increase in room temperature so that the refrigerating effects on the oil 27 are reduced. The temperature of the oil therefore increases, and when proper adjustment of the system has been made this increase can be controlled to correspond exactly with the increase in room temperature. Thus the temperature differential between room temperature and the temperature of the machine parts cooled by the oil remains substantially constant.

In Figure 6 there is shown a modified structure, in which the expansion coil 91 for the refrigerant is of smaller size than the corresponding element shown in Figure 4. Directly to one side of the coil and also contained within the bed 1 there may be provided a motor 92 connected to a propeller 93, or other rotary fluid-circulating element. The purpose of the propeller is to cause the oil to move through paths roughly indicated by the arrows 94, these paths intercepting the expansion coil 91 so that all of the oil eventually is passed through the coil and thus becomes cooled by the contained refrigerant. The modified structure has the advantage over that shown in Figure 4 in that the expansion coil 91 may be of a much smaller size than the element 51, and in addition may be readily procurable on the market instead of having to be especially designed and manufactured for the particular grinder bed. The motor 92 may be of any standard sealed-in type so that the combined motor and coil arrangement 91 constitutes an inexpensive structure. It will be understood that the modified coil shown in Figure 6 is intended to be used in the same manner as the coil 51 shown in the other figures, and is readily adaptable to the refrigerating system and electrical circuits shown in Figure 3.

It will be understood that I desire to comprehend within my invention such modifications as come within the scope of the claims and the invention.

Having thus fully described my invention, what I claim as new and desire to secure by Letters Patent, is:

1. A metal working machine having a tool carriage, a bed which is provided with a plurality of ways over which said tool carriage reciprocates, means for moving said carriage, means including a source of lubricant for lubricating the ways of the machine, means including a lubricant cooling system for maintaining a constant differential between the temperature of the room in which the machine is positioned and the temperature of said lubricant, said last-mentioned means including a thermostat adapted to be placed within the lubricant, a bellows responsive to the movement of said thermostat, a thermostat responsive to changes in room temperature and a bellows responsive to the movement of the room thermostat, an electric switch, and an interconnecting mechanism between the switch and said bellows whereby one bellows serves to close the switch and the other bellows serves to open the switch when the temperature at both thermostats rises, said switch forming a part of a control mechanism for said lubricant cooling means whereby a constant temperature differential is maintained between the temperature of the room and the temperature of said source of lubricant.

2. In combination, a metal working machine having a tool carriage, a bed which is provided with a plurality of ways over which a tool carriage reciprocates, a hydraulic motor for moving said carriage, a source of oil connected to said motor and also connected to the ways of the machine in order to lubricate the same, means including a refrigerating apparatus for maintaining the temperature of said oil at a constant differential with respect to varying room temperatures only after said machine becomes heated, said means including thermostats which respond respectively to changes in the temperature of the oil and the temperature of the room in which the machine is located, said thermostats being of the pneumatic type and being connected to a pair of opposed bellows, a rod connected to be moved in one direction by an increase in pressure in one of said bellows and in the other direction by an increase in pressure in the other of said bellows, and a control device responsive to the movements of said rod for determining when the refrigerating apparatus will be operated to cool said oil.

3. A metal working machine having a bed with a plurality of ways, a carriage slidable on said ways and means for reciprocating said carriage, a source of lubricant for said ways, means of circulating said lubricant over said ways, and means of maintaining the temperature of said lubricant within predetermined limits relative to the temperature of the room in which said machine is located comprising, cooling means to cool said lubricant, control means movable into a first position to make said cooling means effective and into a second position to make said cooling means ineffective, a first thermal responsive means in said lubricant responsive to increases in temperature thereof to urge said control means toward its first position, and a second thermal responsive means positioned in said room and responsive to increases in temperature thereof to urge said control means toward said second position.

4. A metal working machine having a bed with a plurality of ways, a carriage slidable on said ways and means for reciprocating said carriage, a source of lubricant for said ways, means of circulating said lubricant over said ways, and means of maintaining the temperature of said lubricant within predetermined limits relative to the temperature of the room in which said machine is located comprising, cooling means to cool said lubricant, control means movable into a first position to make said cooling means effective and into a second position to make said cooling means ineffective, yielding means continuously urging said control means toward its second position, a first thermal responsive element responsive to increases in lubricant temperature to urge said control means toward its first position, and a second thermal responsive element responsive to increases in room temperature to assist said yielding means in urging said control means toward its second position.

5. A metal working machine having a bed with a plurality of ways, a carriage slidable on said ways and means for reciprocating said carriage, a source of lubricant for said ways, means of circulating said lubricant over said ways, and means of maintaining the temperature of said lubricant within predetermined limits relative to the temperature of the room in which said machine is located comprising, cooling means to cool said lubricant, control means including a switch movable into closed position to make said cooling means effective and into open position to make said cooling means ineffective, yielding means continuously urging said switch toward its open position, a first bellows arranged to oppose said yielding means and a second bellows arranged to assist said yielding means, a first thermal responsive element arranged to be responsive to lubricant temperature and connected to actuate said first bellows, and a second thermal responsive element arranged to be responsive to room temperature and connected to actuate said second bellows.

WILLIAM G. BALDENHOFER.